J. PHILLIPS.
Revolving-Harrow.

No. 161,057.  Patented March 23, 1875.

WITNESSES
E. H. Bates
Robert Everett

INVENTOR
James Phillips
Chipman Hosmer & Co
Attorneys

UNITED STATES PATENT OFFICE.

JAMES PHILLIPS, OF THORNTOWN, INDIANA.

IMPROVEMENT IN REVOLVING HARROWS.

Specification forming part of Letters Patent No. 161,057, dated March 23, 1875; application filed August 1, 1874.

*To all whom it may concern:*

Be it known that I, JAMES PHILLIPS, of Thorntown, in the county of Boone and State of Indiana, have invented a new and valuable Improvement in Revolving Harrows; and I do hereby declare that the following is a full, clear, and exact description of the construction and operation of the same, reference being had to the annexed drawings, making a part of this specification, and to the letters and figures of reference marked thereon.

Figure 1:
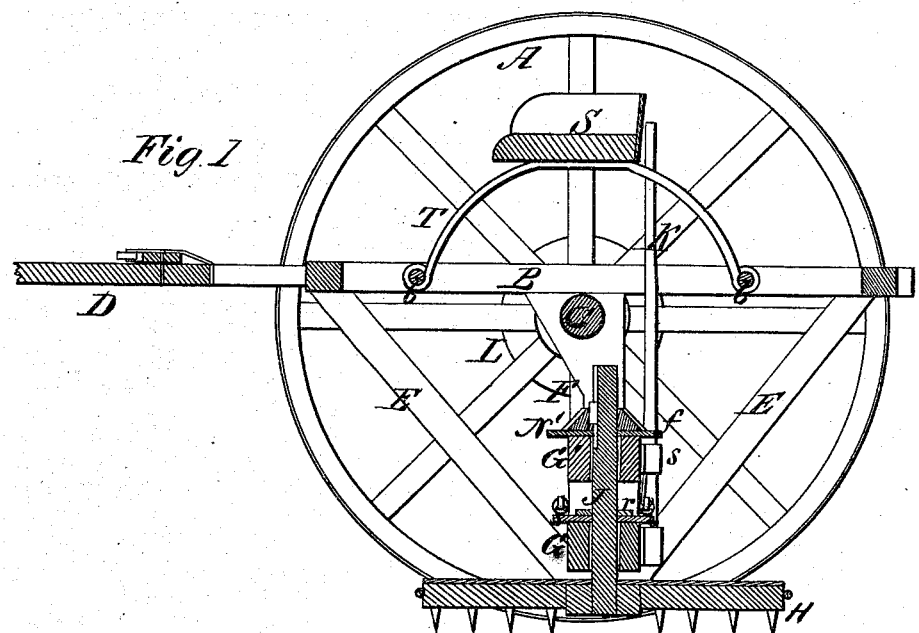
Figure 2:
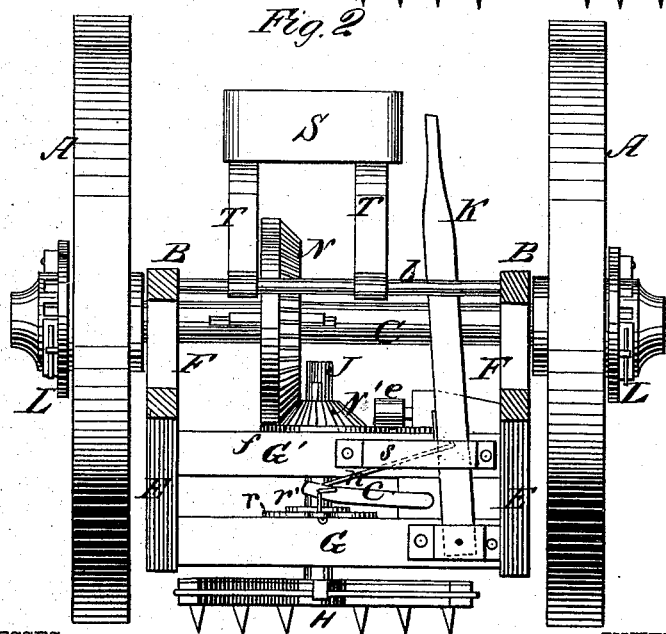

Figure 1 of the drawing is a representation of a sectional view of my revolving harrow. Fig. 2 is an end view of the same.

This invention has relation to revolving harrows which are mounted in a carriage-frame, and rotated by means of spur-wheels and the transporting-wheels of said frame. The nature of my invention and improvement consists in allowing vertical movement to the harrow-shaft, and in giving such movement to this shaft by means of a laterally-vibrating lever, a connecting-rod, a collar, and two vibrating arms, in combination with a rack and a tooth, whereby the driver, sitting on his seat, can conveniently raise or allow depression on the harrow, as will be hereinafter more fully explained.

In the annexed drawings, A A designate two transporting and driving wheels, which are applied on axle C by means of clutching devices L L, which will cause the wheels to turn the axle when the machine is moved forward, and to turn loosely around the axle when the machine is backed. B designates the main frame, from which depend inclined beams E and vertical beams F, which latter have transverse beams G G' secured to them. N designates a large bevel spur-wheel, which is keyed on the axle C, and which engages with a pinion-wheel, N', on a vertical shaft, J, carrying on its lower end a circular harrow, H. The shaft J is connected to the pinion-wheel N' by means of a feather and groove, which will allow this shaft vertical adjustment while it is being rotated. The wheel N' is held down upon the beam G' by means of an anti-friction wheel, e, pressing on a circular flange, f, applied to the said wheel N'. Shaft J has a collar, r, secured to it between the two beams G G', which collar is attached by short links to the free ends of two vertically-vibrating arms, c, and one of these arms is connected by a rod, n, to a hand-lever, K. This lever is pivoted at its lower end to the beam G and extended up through a staple, s, and terminated on one side of the driver's seat S. It is by means of this lever K that the driver can raise or allow the depression of the harrow by its own gravity, whether the machine be in motion or at rest. The seat S is connected, by arched supports T T, to rods b b, which extend across the frame B in front, and in rear of the axle C.

I am well aware that a rotary harrow keyed upon a vertically-movable shaft is not new; hence I do not claim such invention.

What I claim as new, and desire to secure by Letters Patent, is—

1. The wheel N' on vertically-movable harrow-shaft J, combined with flange f and holding-down wheel e, substantially as described.

2. The combination of the wheel N', provided with flange f, the wheel e, the grooved shaft J, provided with fixed collar r' and sliding collar r, the rod n, arm c, and lever K, operating substantially as described.

In testimony that I claim the above I have hereunto subscribed my name in the presence of two witnesses.

JAMES PHILLIPS.

Witnesses:
 JOHN C. HINES,
 SAMUEL VAIL.